United States Patent
Athley et al.

(10) Patent No.: US 10,361,758 B2
(45) Date of Patent: Jul. 23, 2019

(54) METHODS FOR SELECTING A CODEBOOK

(71) Applicant: Telefonaktiebolaget LM Ericsson (publ), Stockholm (SE)

(72) Inventors: Fredrik Athley, Kullavik (SE); Andreas Nilsson, Göteborg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 90 days.

(21) Appl. No.: 15/510,885

(22) PCT Filed: Feb. 10, 2017

(86) PCT No.: PCT/EP2017/052971
§ 371 (c)(1),
(2) Date: Mar. 13, 2017

(87) PCT Pub. No.: WO2018/145757
PCT Pub. Date: Aug. 16, 2018

(65) Prior Publication Data
US 2018/0302129 A1    Oct. 18, 2018

(51) Int. Cl.
*H04B 7/0456*    (2017.01)
*H04B 7/0426*    (2017.01)
(Continued)

(52) U.S. Cl.
CPC ......... *H04B 7/0426* (2013.01); *H04B 7/0404* (2013.01); *H04B 7/0456* (2013.01);
(Continued)

(58) Field of Classification Search
CPC .... H04B 7/0634; H04B 7/0639; H04B 7/024; H04B 7/0417; H04B 7/0456; H04B 7/0478; H04B 7/0426
(Continued)

(56) References Cited

U.S. PATENT DOCUMENTS

| | | | |
|---|---|---|---|
| 2010/0215110 A1* | 8/2010 | Onggosanusi | H04B 7/0426 375/260 |
| 2011/0249637 A1* | 10/2011 | Hammarwall | H04B 7/0634 370/329 |

(Continued)

OTHER PUBLICATIONS

International Search Report and Written Opinion issued in International Application No. PCT/EP2017/052971, dated Oct. 20, 2017, 20 pages.

*Primary Examiner* — Emmanuel Bayard
(74) *Attorney, Agent, or Firm* — Rothwell, Figg, Ernst & Manbeck, p.c.

(57) ABSTRACT

A method (10) performed in a network node (2) for selecting a codebook is provided. The network node (2) supports a multiple antenna communication mode for communication with a communication device (3). The method (10) comprises measuring (11) received power of a signal from the communication device (3), and selecting (12), based at least on the received power, one of: a first codebook adapted for a coverage limited scenario and a second codebook adapted for an interference limited scenario, for use in codebook based precoding in uplink. A corresponding method (40) in a communication device (3), a network node (2), communication device (3), computer programs and computer program products are also provided.

39 Claims, 4 Drawing Sheets

(51) Int. Cl.
  *H04B 7/0404* (2017.01)
  *H04L 25/03* (2006.01)
  *H04B 17/345* (2015.01)
  *H04L 5/00* (2006.01)
  *H04B 7/06* (2006.01)

(52) U.S. Cl.
  CPC ......... *H04B 17/345* (2015.01); *H04L 5/0073* (2013.01); *H04L 25/03942* (2013.01); *H04B 7/0626* (2013.01)

(58) Field of Classification Search
  USPC ............... 375/219–222, 267, 299, 347, 349
  See application file for complete search history.

(56) References Cited

U.S. PATENT DOCUMENTS

| | | | |
|---|---|---|---|
| 2012/0128088 A1* | 5/2012 | Ko | H04B 7/0465 375/260 |
| 2013/0028213 A1* | 1/2013 | Ko | H04B 7/0623 370/329 |
| 2013/0094468 A1* | 4/2013 | Ko | H04B 7/0404 370/329 |
| 2013/0114559 A1* | 5/2013 | Fujimoto | H04W 72/04 370/329 |
| 2014/0205038 A1* | 7/2014 | Nakamura | H04L 25/0391 375/267 |
| 2014/0286291 A1* | 9/2014 | Einhaus | H04B 7/024 370/329 |
| 2016/0198474 A1* | 7/2016 | Raghavan | H04W 72/0466 370/335 |
| 2016/0248559 A1* | 8/2016 | Guo | H04J 11/0023 |
| 2017/0155434 A1* | 6/2017 | Kim | H04W 76/14 |
| 2018/0145855 A1* | 5/2018 | Chaudhuri | H04L 27/2602 |

* cited by examiner

METHODS FOR SELECTING A CODEBOOK

CROSS REFERENCE TO RELATED APPLICATION(S)

This application is a 35 U.S.C. § 371 National Stage of International Patent Application No. PCT/EP2017/052971, filed Feb. 10, 2017, designating the United States, the disclosure of which is incorporated by reference.

TECHNICAL FIELD

The technology disclosed herein relates generally to the field of wireless communications, and in particular to methods for codebook selection, to a network node, a communication device, computer programs and computer program products.

BACKGROUND

Uplink (UL) Multiple-Input Multiple-Output (MIMO) was introduced in Long Term Evolution (LTE) Release 10 for up to 4 transmit (Tx) antennas at the user equipment (UE). MIMO can be used to improve the UL data transmission performance by UL beamforming and spatial multiplexing and to improve the UL control-channel performance by transmit diversity. An UL precoder is determined by a base station (BS) and is conveyed to the UE as part of a scheduling grant. Typically, the BS determines the precoder by first estimating an UL channel matrix by measuring received UL sounding reference signals (SRS) transmitted by the UE. The BS can then evaluate predicted performance for a set of pre-defined candidate precoding matrices specified by a so called codebook and select the one which gives the highest performance. The aim of precoding is to achieve the best possible data reception at the receiver. The BS then only needs to signal, to the UE, an index of the codebook entry that it has selected, referred to as precoder matrix indicator (PMI). The UE should then use the precoder matrix determined by the BS in its data transmission.

LTE uses Orthogonal frequency-division multiplexing (OFDM)-based waveforms for the transmission. To enable high power amplifier efficiency on the UE side it is important to use a transmission with low cubic metric. The cubic metric is a metric of the reduction in power capability of a typical power amplifier. Therefore, Discrete Fourier Transform (DFT)-spread OFDM is used in the LTE UL data transmission. In order to preserve the good cubic metric properties of DFT-spread OFDM when UL precoding is used, all precoder matrices map the layers to the antenna ports such that at most one layer is mapped to each antenna port; i.e. each antenna transmits a single-carrier waveform and thereby preserves the cubic metric of DFT-spread OFDM.

In new radio (NR) access currently being specified for the next generation of wireless communication, 5G, it is foreseen that the number of UE transmission (Tx) antennas will increase. Systems operating at much higher carrier frequencies than today are expected, e.g. operating in the millimeter wave (mmW) bands. The main motivation for going up in frequency is the availability of spectrum in these bands. However, this also poses challenges in radio network design due to the high propagation loss associated with high frequencies. This excess propagation loss can be mitigated by using beamforming at the BS and/or the UE. Since the physical size of an isotropic antenna decreases with increased frequency, there is an opportunity to accommodate a larger number of antennas within a given device form factor. This enables high gain beamforming also on the UE side. Different UE antenna architectures for high frequencies are currently being discussed. One option is to use one- or two-dimensional arrays of elements having wide angular coverage. Another option is to have several directive antennas covering different angular sectors.

Overall and prevailing challenges and requirements in these considerations are that the UEs should have good coverage in order to keep user satisfaction, and as a means to meet this desire, any interference needs to be controlled.

SUMMARY

An objective of the present disclosure is to address the above mentioned challenges and requirements. A particular objective is to enable improved uplink coverage or reduced interference in different scenarios. This objective and others are achieved by the methods, devices, computer programs and computer program products according to the appended independent claims, and by the embodiments according to the dependent claims.

The objective is according to an aspect achieved by a method performed in a network node for selecting a codebook, wherein the network node supports a multiple antenna communication mode for communication with a communication device. The method comprises measuring received power of a signal from the communication device, and selecting, based at least on the received power, one of: a first codebook adapted for a coverage limited scenario and a second codebook adapted for an interference limited scenario, for use in codebook based precoding in uplink.

The method provides several advantages. By means of the method using codebooks adapted for particular scenarios improved uplink coverage is obtained in coverage limited scenarios and reduced interference is obtained in interference limited scenarios. The method enables reduced signaling overhead and computations by selecting one of several adapted codebooks compared to having a single large codebook.

The objective is according to an aspect achieved by a computer program for a network node. The computer program comprises computer program code, which, when run on at processing circuitry of the network node causes the network node to perform the method as above.

The objective is according to an aspect achieved by a computer program product comprising a computer program as above and a computer readable means on which the computer program is stored.

The objective is according to an aspect achieved by a network node for selecting a codebook. The network node supports a multiple antenna communication mode for communication with a communication device and is configured to: measure received power of a signal from the communication device, and select, based at least on the received power, one of: a first codebook adapted for a coverage limited scenario and a second codebook adapted for an interference limited scenario, for use in codebook based precoding in uplink.

The objective is according to an aspect achieved by a method performed in a communication device for codebook based precoding in uplink. The method comprises: transmitting a signal to a network node, receiving, in response, one of: a precoding matrix indicator to a first codebook adapted for a coverage limited scenario and a precoding matrix indicator to a second codebook adapted for an interference limited scenario, and using, based on the received precoding matrix indicator, a precoder matrix for precoding in uplink.

The objective is according to an aspect achieved by a computer program for a communication device. The computer program comprises computer program code, which, when run on at processing circuitry of the communication device causes the communication device to perform the method as above.

The objective is according to an aspect achieved by a computer program product comprising a computer program as above and a computer readable means on which the computer program is stored.

The objective is according to an aspect achieved by a communication device for codebook based precoding in uplink. The communication device is configured to: transmit a signal to a network node, receive, in response, one of: a precoding matrix indicator to a first codebook adapted for a coverage limited scenario and a precoding matrix indicator to a second codebook adapted for an interference limited scenario, and use, based on the received precoding matrix indicator, a precoder matrix for precoding in uplink.

Further features and advantages of the embodiments of the present teachings will become clear upon reading the following description and the accompanying drawings.

DETAILED DESCRIPTION

Figure 1:
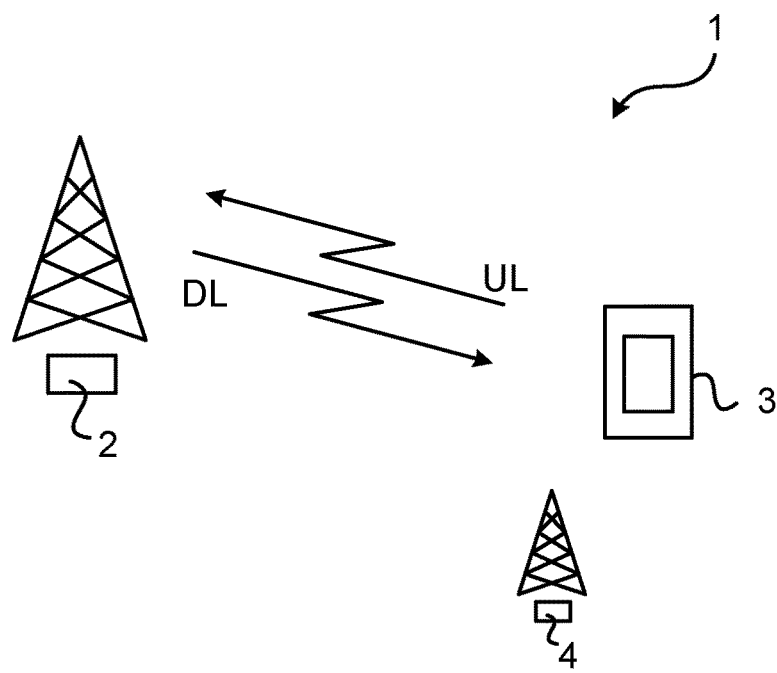
FIG. 1 illustrates schematically an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

The UL performance in 5G networks may in some cases become coverage limited and in some cases interference limited. More specifically, the high propagation loss and limited UE Tx power at high frequencies may cause coverage problems in some scenarios. On the other hand, 5G cellular networks are expected to be more densely populated with both BSs and UEs which may lead to performance being limited by interference rather than thermal noise.

For 5G, ordinary OFDM (i.e. without DFT spreading) is being considered also for the UL. One motivation for this is that the overall design may be simplified by having the same waveform in both directions, especially for sidelink and self-backhauling.

Existing codebook of precoding matrices for UL MIMO in LTE have been designed such that the precoding matrices are selected based on criteria related to the instantaneous state of the channel. These codebooks have not been designed in view of distinguishing between interference limited or power limited scenarios or different UE antenna architectures. Furthermore, the known codebooks may not be suitable for future system operating at higher frequencies where UE antenna architectures may differ and comprise planar arrays of many, more or less omnidirectional, elements as well as a few directional antenna elements covering different angular sectors.

Based on the above observations, the present teachings provide methods and means for a selecting which codebook to use based on the particular situation at hand, information on which a base station can obtain from the communication device(s) and also from neighboring base stations.

FIG. 1 illustrates an environment in which embodiments according to the present teachings may be implemented. A wireless communications system 1 comprises a number of network nodes 2, 4 e.g. a radio access node such as a BS 2, evolved node B (eNB), or gNB (which is a notation for access node in 5G). In the illustrated case, a first network node 2, in the following exemplified by BS, is serving a communication device 2 by providing it wireless communication in a coverage area (also known as cell) of the BS 2. The communication from the BS 2 to the communication device 3, in the following exemplified by a UE, is denoted downlink communication. The communication from the UE 3 to the BS 2 is denoted uplink communication. In FIG. 1, a neighboring BS 4 is also illustrated, i.e. a BS not currently serving the UE 3 but that could be a candidate BS for becoming the serving BS of the UE 3.

Since OFDM without DFT spreading is being considered for the UL data transmission in 5G, the restriction of mapping at most one layer per antenna port can be relaxed because the impact on cubic metric of mixing several layers will be small. This opens new possibilities to design different codebooks for different scenarios and antenna architectures.

In view of this, the present teachings provide, in different embodiments, methods wherein a network node, e.g. the BS 2, selects between different UL MIMO codebooks, or equivalently selects between subsets of a larger codebook, based on if the UE's 3 performance is coverage limited or interference limited. Whether the UE is coverage limited or interference limited may be determined based on received power from the served UE 3, the received power from interfering UEs, the thermal noise power and/or if possible also the interference generated to neighboring cells. The total power in [W] or the power spectral density, i.e. power per bandwidth unit in [W/Hz] can be used as measure on deciding whether the UE's performance is coverage limited or interference limited. It is noted that these measures may be different if the desired signal and the interference have different bandwidths. The interference generated to neighboring cells may require some signaling between BSs 2, 4 in order to convey interference information. For example, the neighbor BS 4 may signal that it receives strong interference from the UE 3 served by the current BS 2, or the UE 3 may signal to its serving BS 2 that it is likely to create strong interference to a neighbor BS 4. The interference generated to neighboring cells may in addition or as an alternative be based on a priori information on deployment, traffic load, etc. and by short term and long term interference measurements.

In some embodiment, the serving BS 2 may select different codebooks also based on the antenna architecture of the UE 3, e.g., based on that the UE 3 has directional antennas covering different angular sectors or that it has panel arrays with elements having wide angular coverage. One alternative to obtain knowledge on the antenna architecture of the UE is that the serving BS 2 tests different codebooks designed for different UE antenna architectures. In order to reduce the number of codebooks, another alternative is that the UE 3 signals the antenna architecture to the serving BS 2, e.g., as an index to a predefined set of antenna architectures. The current codebook selection can also use previous codebook selections as input to the decision in order to reduce the number of alternatives.

The codebook selection can be UE-specific so that the BS 2 can select different codebooks for different UEs. The selected codebook and codebook index (i.e. PMI) can be signaled to the UE 2 in an UL scheduling grant. In order to reduce signaling overhead, the selected codebook may be signaled less frequently and/or only the codebook index may be signaled in the scheduling grant. The accuracy of codebook selection is not affected to any larger extent by e.g. less frequent signaling of selected codebook, since the coverage and average interference level is varying slowly with time.

By selecting one of several codebooks instead of having a single large codebook the signaling overhead can be reduced as well as the computations involved in evaluating different PMIs in the codebook.

Another alternative is that the UE 2 reports Channel State Information (CSI) for several codebooks, or subsets of a codebook, and the BS 2 determines which one to use based on metrics described above. The CSI may comprise one or more of, for instance, Channel Quality Indicator (CQI), precoding matrix indicator (PMI), precoding type indicator (PTI) or rank indicator (RI).

Figure 2:
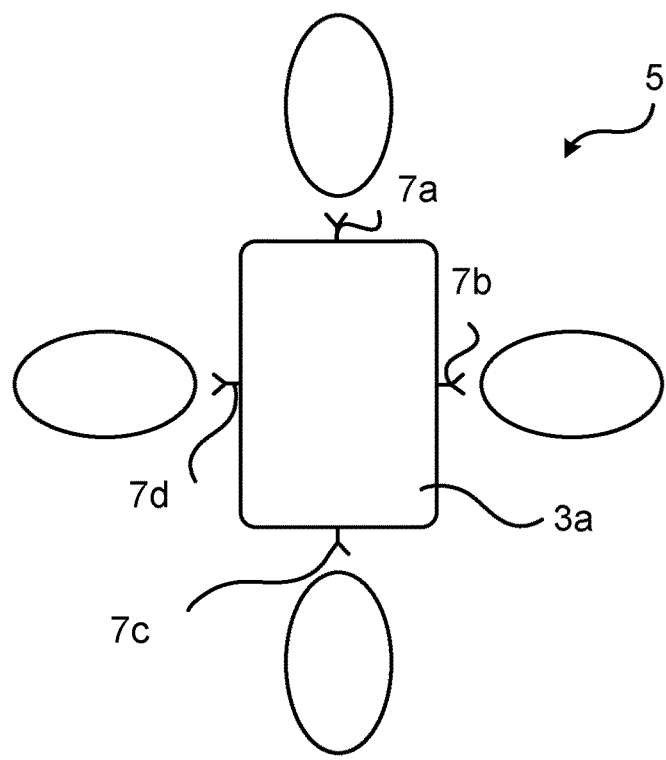
FIG. 2 illustrates exemplary antenna architecture of a communication device.

FIG. 2 illustrates exemplary antenna architecture 5 of a communication device. The antenna architecture 5 of the UE 3a is shown to comprise four directional antennas 7a, 7b, 7c, 7d, each covering an angular sector corresponding to a respective side of the UE. These sectors are illustrated in FIG. 2 as oval shapes. In this antenna architecture 5, it is assumed that each of the directional antennas 7a, 7b, 7c, 7d is connected to a respective power amplifier (PA, not illustrated).

In a coverage limited scenario, i.e. when the performance is limited by the available UE Tx power and antenna gain rather than interference, it is advantageous to use all antennas 7a, 7b, 7c, 7d and PAs of the UE 3a since this will maximize the power received by the BS 2. Typically, there is a rich scattering environment around a handheld device and thus all antennas 7a, 7b, 7c, 7d may give significant contribution to the received power at the BS 2 even if they point in different directions. According to an aspect of the present teachings, a codebook that utilizes all antenna ports in the UE 3a is used for this antenna architecture 5 and scenario. For example, such a codebook may be designed based on DFT vectors and/or maximization of minimum chordal distance between pairs of precoding vectors.

On the other hand, in an interference limited scenarios it may not be beneficial for system performance that the UE 3a transmits on all antennas 7a, 7b, 7c, 7d if there is enough path gain to one or a few UE antennas 7a, 7b, 7c, 7d. Transmitting on all UE antennas 7a, 7b, 7c, 7d will in this case only generate excessive interference. Instead, it is better that the UE 3a transmits only on one or a few of the antennas 7a, 7b, 7c, 7d with highest path gain to the BS 2. According to an aspect of the present teachings, the BS 2 uses another codebook, or codebook subset, for this scenario. The codebook in this case may comprise a selection of matrices that selects one or a few antennas with the highest path gain. Another reason for not transmitting on all antennas is that if there is a rich scattering environment so that the antenna correlation is low, it is difficult to achieve an efficient coherent combining of the antennas in the transmission when the number of antennas is large, since it would require a very large codebook. There would still be an increased transmitted power by using all PAs, but it would generate almost as much interference as useful signal if the antennas cannot be combined coherently.

Figure 3:
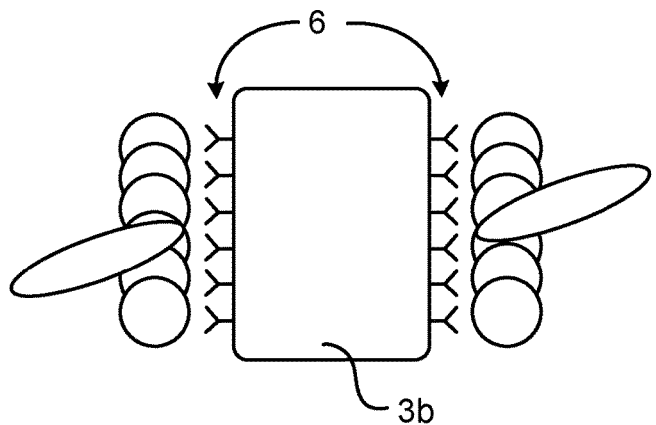
FIG. 3 illustrates exemplary antenna architecture of a communication device.

FIG. 3 illustrates another exemplary antenna architecture 6 of a communication device. This antenna architecture 6 is another UE antenna architecture candidate for future high frequency systems. The antenna architecture 6 comprises a one- or two-dimensional array of elements having wide angular coverage, similar to a traditional BS antenna. This is a viable architecture for high frequencies since the UE 3b is relatively large in terms of wavelengths. Due to UE 3b rotation and blocking (e.g. a user's hand or head) several such arrays facing different directions may be needed. One example is illustrated in FIG. 3 where two linear arrays are placed on opposite sides of the UE 3b.

In a rich scattering environment all significant propagation paths should be utilized to maximize the received power at the BS 2, e.g. by using maximum ratio transmission (MRT). This requires knowledge of the full channel matrix at the transmitter (UE 3) which is typically not available unless reciprocity can be assumed. However, quantized channel knowledge can be conveyed to the UE 3 from the BS 2 by the use of codebooks. In such a propagation environment the resulting radiation pattern of the precoded transmission is not necessarily directional. It can radiate in all directions and still add constructively at the BS 2 by proper coherent combining of the different propagation paths in the transmission. Since such a transmission is not very directional it can cause high interference to other BSs 4. To reduce interference, a directional transmission with a narrow beam along the strongest propagation path, whether it be a line-of-sight path or a strong reflection, to the serving BS 2 can be used.

As for the first antenna architecture 5 (shown in FIG. 2), also for the antenna architecture 6 shown in FIG. 3, a selection can be made between two different codebooks, or between two subsets of a larger codebook; one for a coverage limited scenario and one for an interference limited scenario. For coverage limited and rich scattering scenarios a codebook designed for uncorrelated antennas is used. The signals received on the different antennas should have low correlation. Such a codebook could be designed by, e.g., maximizing minimum chordal distance between pairs of precoding vectors. For interference limited scenarios, a codebook that creates pencil beams is used. This codebook could be designed based on DFT vectors. To reduce interference, some tapering can be applied on the DFT vectors to reduce radiation pattern sidelobes.

The various features and embodiments that have been described can be combined in many different ways, examples on which are given in the following.

Figure 4:
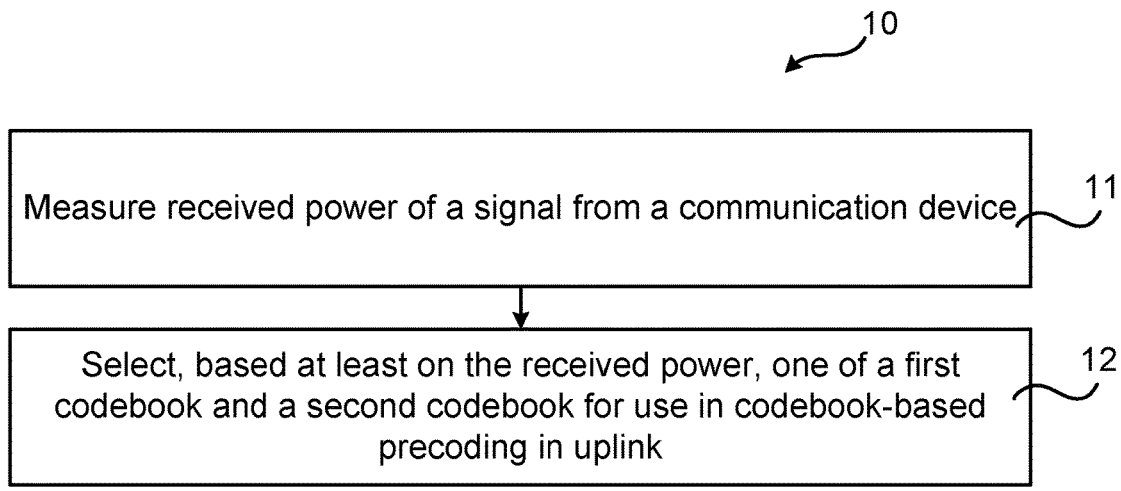
FIG. 4 illustrates a flow chart over steps of an embodiment of a method in a network node in accordance with the present teachings.

FIG. 4 illustrates a flow chart over steps of an embodiment of a method in a network node in accordance with the present teachings. A method 10 that can be performed in or by a network node 2 for selecting a codebook is provided. The network node 2 supports a multiple antenna communication mode for communication with a communication device 3. The multiple antenna communication mode may, for instance, be a multiple-input multiple-output, MIMO, communication mode, i.e. the network node 2 supporting the MIMO mode.

The method 10 comprises measuring 11 received power of a signal from the communication device 3. This can be made in a conventional manner.

The method 10 comprises selecting 12, based at least on the received power, one of: a first codebook adapted for a coverage limited scenario and a second codebook adapted for an interference limited scenario, for use in codebook based precoding in uplink.

In an embodiment, the selecting 12 is further based on one or both of: received power from interfering communication devices and interference experienced in neighboring cells.

The neighboring cell may be served by the network node 2 or by a neighboring network node 4. The interference to neighboring cells may be generated by a single communication device 3 in the cell, all served communication devices in the cell or all communication devices in a communication system comprising the network node 2.

In various embodiments, the selecting 12 is further based on antenna architecture 5, 6 of the communication device 3.

In various embodiments, the method 10 comprises receiving channel state information from the communication device 3, the channel state information relating to one or more codebooks. As has been described, the communication device 3 may report CSI for several codebooks (or subsets of codebooks). The network node 2 may then use this CSI to select proper precoding matrix, when having determined which codebook to use.

In various embodiments, the first codebook adapted for the coverage limited scenario is designed for uncorrelated antennas. As has been noted earlier, the signals received on different antennas should have low correlation, e.g. <0.7.

In a variation of the above embodiment, the entries of the first codebook are based on maximizing minimum chordal distance between pairs of precoding vectors.

In various embodiments, one or both of the first codebook adapted for coverage limited scenarios and the second codebook adapted for interference limited scenarios are designed to create narrow beams. The beam may be very narrow, i.e. pencil beams, for the high frequencies expected to be used in future wireless communications system. The narrow beams may reduce the interference.

In variations of the above embodiment, the precoding matrices of the second codebook are based on Discrete Fourier Transform vectors.

In some embodiments, the entries of the first codebook comprise selection matrices for antenna element selection. As a particular example: for a single layer and eight antennas, the selection matrix (vector in this case) may, be w=[0 0 1 0 0 0 0 0]$^T$. That is, the selection matrix selects one or more antennas (one in this example) on which the signal is transmitted.

In some embodiments, to reduce interference, some tapering can be applied on the DFT vectors to reduce radiation pattern sidelobes. For case of directional antennas pointing in different directions, an example on the second codebook, adapted for interference limited scenarios, is a codebook wherein the precoding matrices comprises zeroes in all positions except one position which has value one (1): the antenna port sending the (directional) signal.

In various embodiments, the method 10 comprises sending, to the communication device 3, a precoding matrix index indicating a precoder matrix for use by the communication device 3 in its data transmission.

In various embodiments, the first and second codebooks are a respective subset of a single codebook.

Figure 5:
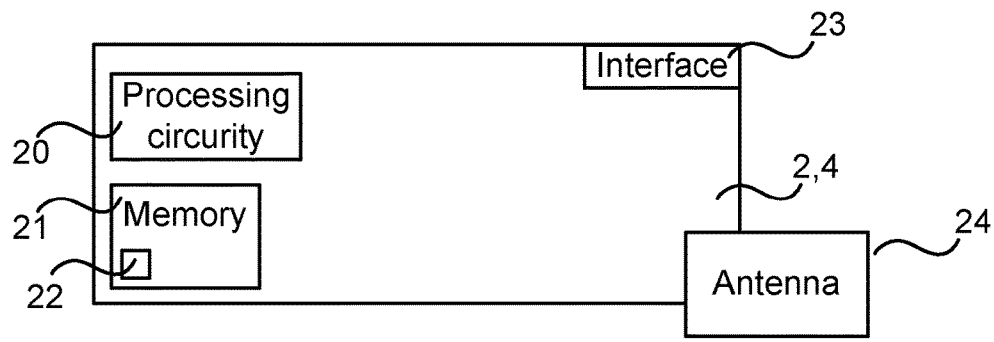
FIG. 5 illustrates schematically a network node and means for implementing embodiments of the method in accordance with the present teachings.

FIG. 5 illustrates schematically a network node and means for implementing embodiments of the method in accordance with the present teachings. The network node 2, 4 comprises processing circuitry 20, which may be any combination of one or more of a suitable central processing unit (CPU), multiprocessor, microcontroller, digital signal processor (DSP), etc., capable of executing software instructions stored in a computer program product 21, e.g. in the form of a storage medium 21. The processing circuitry 20 may further be provided as at least one application specific integrated circuit (ASIC), or field programmable gate array (FPGA).

The processing circuitry 20 is configured to cause the network node 2, 4 to perform a set of operations, or steps, e.g. as described in relation to FIG. 4. For example, the storage medium 21 may store the set of operations, and the processing circuitry 20 may be configured to retrieve the set of operations from the storage medium 20 to cause the network node 2, 4 to perform the set of operations. The set of operations may be provided as a set of executable instructions. The processing circuitry 20 is thereby arranged to execute methods as disclosed herein.

The storage medium 21 may also comprise persistent storage, which, for example, can be any single one or combination of magnetic memory, optical memory, solid state memory or even remotely mounted memory.

The network node 2, 4 may also comprise an input/output device 23 for communicating with other entities and devices, e.g. with the communication device 3 and/or with other network nodes. The input/output device 23 may be an interface and may, for instance, comprise a protocol stack, for communication with other devices, network nodes or entities. The input/output device 23 may be used for receiving data input and for outputting data.

The network node 2 supports a multiple antenna communication mode for communication with a communication device 3. In particular, the network node 2 may comprise or be connected to an antenna system 24 and be configured to control such antenna system. The network node 2 may be configured to such multiple antenna communication mode, e.g. a MIMO mode and may, to this end, comprise processing circuitry adapted for such modes.

A network node 2 for selecting a codebook is provided. The network node 2 supports a multiple antenna communication mode for communication with a communication device 3. The network node 2 is configured to:

measure received power of a signal from the communication device 3, and select, based at least on the received power, one of: a first codebook adapted for a coverage limited scenario and a second codebook adapted for an interference limited scenario, for use in codebook based precoding in uplink.

The network node 2 may be configured to perform the above steps e.g. by comprising processing circuitry 60 and memory 21, the memory 21 containing instructions executable by the processing circuitry 20, whereby the network node 2 is operative to perform the steps. That is, in an embodiment, a network node is provided for selecting a codebook is provided. The network node 2 comprises processing circuitry 20 and memory 21, the memory 21 containing instructions executable by the processing circuitry 20, whereby the network node 2 is operative to: measure received power of a signal from the communication device 3, and select, based at least on the received power, one of: a first codebook adapted for a coverage limited scenario and a second codebook adapted for an interference limited scenario, for use in codebook based precoding in uplink.

In an embodiment, the network node 2 is configured to select further based on one or both of: received power from interfering communication devices and interference experienced in neighboring cells.

In various embodiments, the network node 2 is configured to receive information on antenna architecture 5, 6 of the communication device 3. In such embodiments, the network node 2 may be configured to select codebook based also on the antenna architecture of the communication device.

In various embodiments, the network node 2 is configured to receive channel state information from the communication device 3, the channel state information relating to one or more codebooks.

In various embodiments, the first codebook adapted for the coverage limited scenario is designed for uncorrelated antennas.

In variations of the above embodiment, entries of the first codebook are based on maximizing minimum chordal distance between pairs of precoding vectors.

In various embodiments, one or both of the first codebook adapted for coverage limited scenarios and the second codebook adapted for interference limited scenarios are designed to create narrow beams. The precoding matrices of the second codebook may, for instance, be based on discrete Fourier Transform vectors.

In various embodiments, the entries of the first codebook comprise selection matrices for antenna element selection.

The network node 2 may send, to the communication device 3, a precoding matrix index indicating a precoder matrix for use by the communication device 3 in its data transmission.

In various embodiments, the first and second codebooks are a respective subset of a single codebook.

Figure 6:
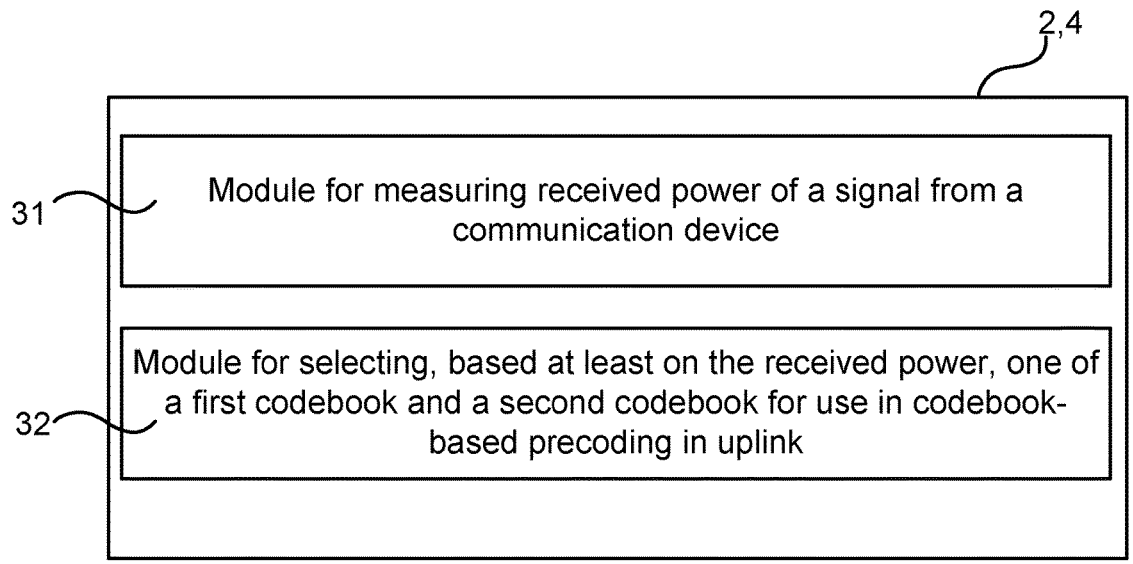
FIG. 6 illustrates a network node comprising function modules/software modules for implementing embodiments of the present teachings.

FIG. 6 illustrates a network node comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A network node 2 is provided for selecting codebook. The network node 2 comprises a first module 31 for measuring received power of a signal from a communication device. The first module 31 may, for instance, comprise processing circuitry adapted to measure received power, e.g. based on a first signal received from an antenna device, which in turn has received the signal from the communication device.

The network node 2 comprises a second module 32 for selecting, based at least on the received power, one of a first codebook and a second codebook for use in codebook-based precoding in uplink. The second module 32 may, for instance, comprise processing circuitry adapted for such selection. The second module 32 may, for instance, receive a value of the measured received power and select based thereon the codebook.

In is noted that one or both of the modules 31, 32 may be replaced by units.

Figure 7:
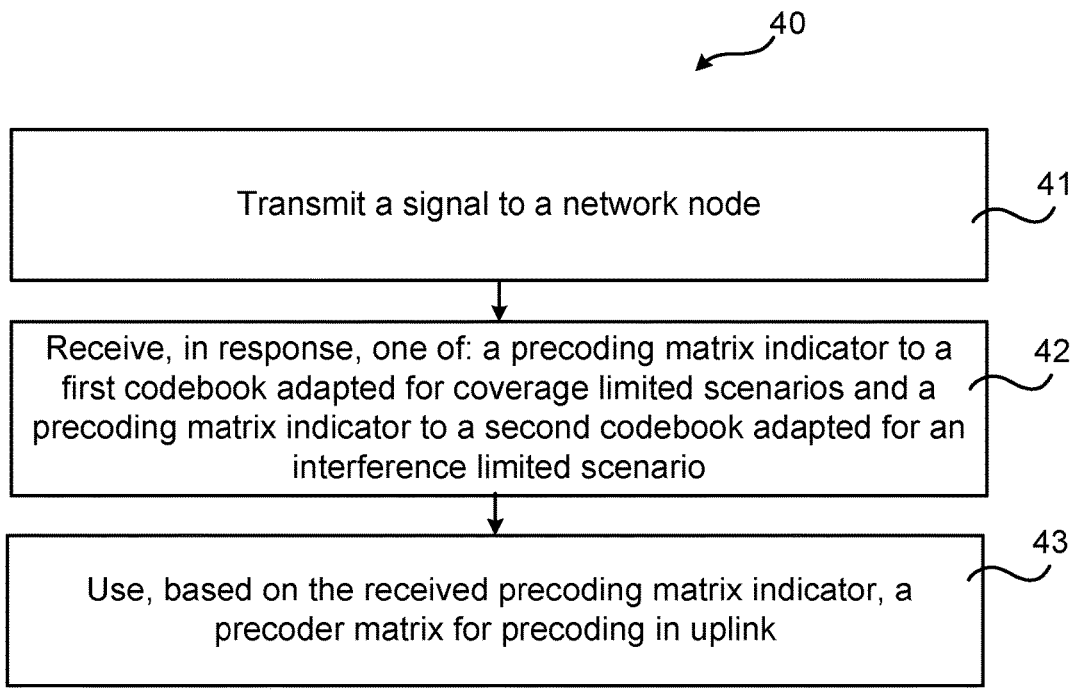
FIG. 7 illustrates a flow chart over steps of an embodiment of a method in a communication device in accordance with the present teachings.

FIG. 7 illustrates a flow chart over steps of an embodiment of a method in a communication device in accordance with the present teachings. A method 40 performed in a communication device 3 is provided for codebook based precoding in uplink.

The method 40 comprises transmitting 41 a signal to a network node 2. The signal may be any type of signal, e.g. a reference signal.

The method 40 comprises receiving 42, in response, one of: a precoding matrix indicator to a first codebook adapted for a coverage limited scenario and a precoding matrix indicator to a second codebook adapted for an interference limited scenario. The precoding matrix indicator of the indicated codebook is then to be used by the communication device 3.

The method 40 comprises using 43, based on the received precoding matrix indicator, a precoder matrix for precoding in uplink. When the communication device 3 has received the precoding matrix index indicating which precoder matrix to use, it may then use it in its data transmission.

In an embodiment, the method 40 comprises providing information to the network node 2 about antenna architecture 5, 6 of the communication device 3.

In an embodiment, the method 40 comprises providing information to the network node 2 about channel state information relating to one or more codebooks.

In various embodiments, the first codebook adapted for the coverage limited scenario is designed for uncorrelated antennas.

In various embodiments, the second codebook adapted for interference limited scenarios is designed to create narrow beams.

In various embodiments, the first and second codebooks are a respective subset of a single codebook.

Figure 8:
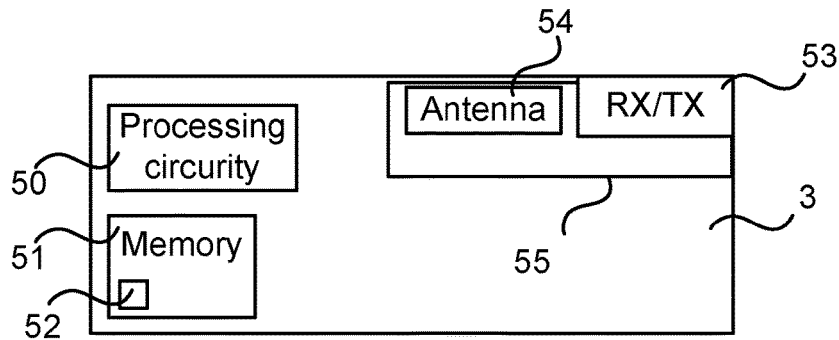
FIG. 8 illustrates schematically a communication device and means for implementing embodiments of the method in accordance with the present teachings.

FIG. 8 illustrates schematically a communication device and means for implementing embodiments of the method in accordance with the present teachings. The communication device 3 comprises processing circuitry 50, which may be any combination of one or more of a suitable central processing unit (CPU), multiprocessor, microcontroller, digital signal processor (DSP), etc., capable of executing software instructions stored in a computer program product 51, e.g. in the form of a storage medium 51. The processing circuitry 50 may further be provided as at least one application specific integrated circuit (ASIC), or field programmable gate array (FPGA).

The processing circuitry 50 is configured to cause the communication device 3 to perform a set of operations, or steps, e.g. as described in relation to FIG. 7. For example, the storage medium 51 may store the set of operations, and the processing circuitry 50 may be configured to retrieve the set of operations from the storage medium 50 to cause the communication device 3 to perform the set of operations. The set of operations may be provided as a set of executable instructions. The processing circuitry 50 is thereby arranged to execute methods as disclosed herein.

The storage medium 51 may also comprise persistent storage, which, for example, can be any single one or combination of magnetic memory, optical memory, solid state memory or even remotely mounted memory.

The communication device 3 also comprises an input/output device 55 comprising, for instance, processing circuitry 53 (indicated by RX/TX in the figure) and antennas 54. The input/output device 55 is used for communicating with other communication devices, with the network node 2, 4 and/or with other network nodes or entities. The input/output device 55 may be an interface and may, for instance, comprise a protocol stack, for communication with other devices, network nodes or entities. The input/output device 55 may be used for receiving data input and for outputting data.

The communication device 3 supports a multiple antenna communication mode for communication with a network node 2. The communication device 3 may be configured to such multiple antenna communication mode, e.g. a MIMO mode and may, to this end, comprise processing circuitry adapted for such modes.

A communication device 3 for codebook based precoding in uplink is provided. The communication device 3 is configured to:

transmit a signal to a network node 2, receive, in response, one of: a precoding matrix indicator to a first codebook adapted for a coverage limited scenario and a precoding matrix indicator to a second codebook adapted for an interference limited scenario, and use, based on the received precoding matrix indicator, a precoder matrix for precoding in uplink.

The communication device 3 may be configured to perform the above steps e.g. by comprising processing circuitry 60 and memory 51, the memory 51 containing instructions executable by the processing circuitry 50, whereby the communication device 3 is operative to perform the steps. That is, in an embodiment, a communication device is provided for codebook based precoding in uplink. The communication device 3 comprises processing circuitry 50 and memory 51, the memory 51 containing instructions executable by the processing circuitry 50, whereby the network node 2 is operative to: transmit a signal to a network node, receive, in response, one of: a precoding matrix indicator to a first codebook adapted for a coverage limited scenario and a precoding matrix indicator to a second codebook adapted for an interference limited scenario, and use, based on the received precoding matrix indicator, a precoder matrix for precoding in uplink.

In an embodiment, the communication device 3 is configured to provide information to the network node 2 about antenna architecture 5, 6 of the communication device 3.

In various embodiments, the communication device 3 is configured to provide information to the network node 2 about channel state information relating to one or more codebooks.

In various embodiments, the first codebook adapted for the coverage limited scenario is designed for uncorrelated antennas.

In various embodiments, the second codebook adapted for interference limited scenarios is designed to create narrow beams.

In various embodiments, the first and second codebooks are a respective subset of a single codebook.

Figure 9:
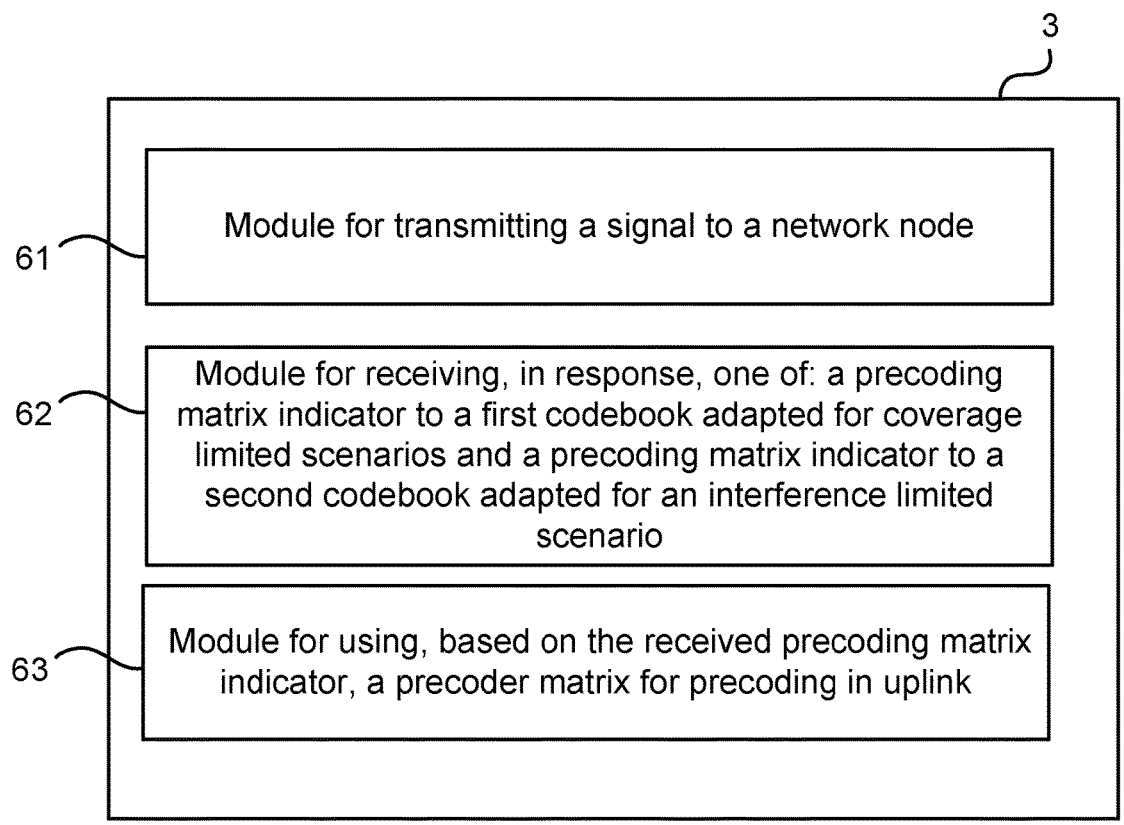
FIG. 9 illustrates a communication device comprising function modules/software modules for implementing embodiments of the present teachings.

FIG. 9 illustrates a communication device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described in various embodiments.

A communication device 3 is provided for codebook based precoding. The communication device 3 comprises a first module 61 for transmitting a signal to a network node. The first module 61 may, for instance, comprise transmission circuitry and/or antennas.

The communication device 3 comprises a second module 62 for receiving, in response, one of: a precoding matrix indicator to a first codebook adapted for a coverage limited scenario and a precoding matrix indicator to a second codebook adapted for an interference limited scenario. The second module 62 may, for instance, comprise receiving circuitry and/or antennas.

The communication device 3 comprises a third module 63 for using, based on the received precoding matrix indicator, a precoder matrix for precoding in uplink. The third module may, for instance, comprise processing circuitry adapted for using a precoder matric for precoding in uplink.

It is noted that one or more of the modules may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a network node for selecting a codebook, the network node supporting a multiple antenna communication mode for communication with a communication device, the method comprising:

measuring received power of a signal from the communication device, and selecting, based at least on the received power, one of: a first codebook adapted for a coverage limited scenario and a second codebook adapted for an interference limited scenario, for use in codebook based precoding in uplink.

2. The method of claim 1, wherein the selecting of the first codebook or the second codebook is further based on one or both of: received power from interfering communication devices and interference experienced in neighboring cells.

3. The method of claim 1, wherein the selecting is further based on antenna architecture of the communication device.

4. The method of claim 1, comprising receiving channel state information from the communication device, the channel state information relating to one or more codebooks.

5. The method of claim 1, wherein the first codebook adapted for the coverage limited scenario is designed for uncorrelated antennas.

6. The method of claim 5, wherein entries of the first codebook are based on maximizing minimum chordal distance between pairs of precoding vectors.

7. The method of claim 1, wherein one or both of: the first codebook adapted for coverage limited scenarios and the second codebook adapted for interference limited scenarios are designed to create narrow beams.

8. The method of claim 7, wherein precoding matrices of the second codebook are based on discrete Fourier Transform vectors.

9. The method of claim 1, wherein the entries of the first codebook comprise selection matrices for antenna element selection.

10. The method of claim 1, further comprising sending, to the communication device, a precoding matrix index indicating a precoder matrix for use by the communication device in its data transmission.

11. The method of claim 1, wherein the first and second codebooks are a respective subset of a single codebook.

12. A computer program product comprising a non-transitory computer readable medium comprising a computer program for a network node, the computer program comprising computer program code, which, when run on a processing circuitry of the network node causes the network node to perform the method of claim 1.

13. A network node for selecting a codebook, the network node supporting a multiple antenna communication mode for communication with a communication device, the network node being configured to:
measure received power of a signal from the communication device, and
select, based at least on the received power, one of: a first codebook adapted for a coverage limited scenario and a second codebook adapted for an interference limited scenario, for use in codebook based precoding in uplink.

14. The network node of claim 13, configured to select based on one or both of: received power from interfering communication devices and interference experienced in neighboring cells.

15. The network node of claim 13, configured to select based on antenna architecture of the communication device.

16. The network node of claim 13, configured to receive channel state information from the communication device 3, the channel state information relating to one or more codebooks.

17. The network node of claim 13, wherein the first codebook adapted for the coverage limited scenario is designed for uncorrelated antennas.

18. The network node of claim 17, wherein entries of the first codebook are based on maximizing minimum chordal distance between pairs of precoding vectors.

19. The network node of claim 13, wherein one or both of: the first codebook adapted for coverage limited scenarios and the second codebook adapted for interference limited scenarios are designed to create narrow beams.

20. The network node of claim 13, wherein the entries of the first codebook comprise selection matrices for antenna element selection.

21. The method of claim 13, wherein the first and second codebooks are a respective subset of a single codebook.

22. A method performed in a communication device for codebook based precoding in uplink, the method comprising:
transmitting a signal to a network node,
receiving, in response, one of: a precoding matrix indicator to a first codebook adapted for a coverage limited scenario and a precoding matrix indicator to a second codebook adapted for an interference limited scenario, and
using, based on the received precoding matrix indicator, a precoder matrix for precoding in uplink.

23. The method of claim 22, comprising providing information to the network node about antenna architecture of the communication device.

24. The method of claim 22, comprising providing information to the network node about channel state information relating to one or more codebooks.

25. The method of claim 22, wherein the first codebook adapted for the coverage limited scenario is designed for uncorrelated antennas.

26. The method of claim 22, wherein the second codebook adapted for interference limited scenarios is designed to create narrow beams.

27. The method of claim 22, wherein the first and second codebooks are a respective subset of a single codebook.

28. A computer program product comprising a non-transitory computer readable medium comprising a computer program for a communication device, the computer program comprising computer program code, which, when run on at processing circuitry of the communication device causes the communication device to perform the method of claim 22.

29. A communication device for codebook based precoding in uplink, the communication device being configured to:
transmit a signal to a network node,
receive, in response, one of: a precoding matrix indicator to a first codebook adapted for a coverage limited scenario and a precoding matrix indicator to a second codebook adapted for an interference limited scenario, and
use, based on the received precoding matrix indicator, a precoder matrix for precoding in uplink.

30. The communication device of claim 29, configured to provide information to the network node about antenna architecture of the communication device.

31. The communication device of claim 29, configured to provide information to the network node about channel state information relating to one or more codebooks.

32. The communication device of claim 29, wherein the first codebook adapted for the coverage limited scenario is designed for uncorrelated antennas.

33. The communication device of claim 29, wherein the second codebook adapted for interference limited scenarios is designed to create narrow beams.

34. The communication device of claim 29, wherein the first and second codebooks are a respective subset of a single codebook.

35. The method of claim 10, wherein the selecting of the first codebook or the second codebook is further based on i) received power from interfering communication devices and/or ii) interference experienced in neighboring cells.

36. The method of claim 2, further comprising sending, to the communication device, a precoding matrix index indicating a precoder matrix for use by the communication device in its data transmission.

37. A method performed in a network node, the network node supporting a multiple antenna communication mode for communication with a communication device, the method comprising:
determining a performance limitation experienced by the communication device, wherein determining the performance limitation comprises: i) determining that the communication device's performance is coverage limited or ii) determining that the communication device's performance is interference limited;
selecting a precoding matrix based on the determined performance limitation; and
sending, to the communication device, a precoding matrix indicator (PMI) indicating the selected precoding matrix, wherein
the selected precoding matrix comprises:
selecting a first precoding matrix adapted for a coverage limited scenario as a result of determining that the communication device's performance is coverage limited, or selecting a second codebook adapted for an interference limited scenario as a result of determining that the communication device's performance is interference limited.

38. The method of claim 37, wherein determining the performance limitation experienced by the communication device comprises determining that the communication device's performance is coverage limited, selecting the precoding matrix based on the determined performance limitation comprises selecting the first precoding matrix, which is adapted for a coverage limited scenario, as a result of determining that the communication device's performance is coverage limited, the communication device comprises a plurality of antennas, and the first precoding matrix utilizes all of the communication device's antennas.

39. The method of claim 37, wherein determining the performance limitation experienced by the communication device comprises determining that the communication device's performance is interference limited selecting a precoding matrix based on the determined performance limitation comprises selecting the second precoding matrix, which is adapted for an interference limited scenario, as a result of determining that the communication device's performance is interference limited, the communication device comprises a plurality of antennas, and the second precoding matrix utilizes less than all of the communication device's antennas.

* * * * *